United States Patent [19]
Doolittle, Jr.

[11] Patent Number: 5,239,773
[45] Date of Patent: Aug. 31, 1993

[54] TREE INJECTION SYSTEM

[76] Inventor: Glayne D. Doolittle, Jr., 9647 Ruggles St., Omaha, Nebr. 68134

[21] Appl. No.: 901,955

[22] Filed: Jun. 22, 1992

[51] Int. Cl.$^5$ ............................................. A01G 29/00
[52] U.S. Cl. ...................................... 47/57.5; 47/1.01
[58] Field of Search ................................. 47/57.5, 1.01

[56] References Cited

U.S. PATENT DOCUMENTS

| | | |
|---|---|---|
| 954,126 | 4/1910 | McAllister . |
| 1,684,865 | 9/1928 | Hansen et al. ...................... 47/57.5 |
| 2,116,591 | 5/1938 | Barber . |
| 2,290,363 | 7/1942 | Stirton ............................... 47/57.5 |
| 2,309,391 | 1/1943 | Hecht ................................. 47/57.5 |
| 2,687,598 | 8/1954 | Calhoun ............................. 47/57.5 |
| 2,821,944 | 2/1958 | Blake ................................. 47/57.5 |
| 2,870,576 | 1/1959 | Parker . |
| 3,077,166 | 2/1963 | Delp ................................... 47/57.5 |
| 3,124,904 | 3/1964 | Mauget . |
| 3,130,519 | 4/1964 | Mauget . |
| 3,286,401 | 11/1966 | Mauget . |
| 3,290,822 | 12/1966 | Mauget ............................... 47/57.5 |
| 3,295,254 | 1/1967 | Schoonman ......................... 47/57.5 |
| 3,304,655 | 2/1967 | Mauget . |
| 3,461,588 | 8/1969 | Johnson . |
| 3,608,239 | 9/1971 | Tucker ................................ 47/57.5 |
| 4,011,685 | 3/1977 | Boyd et al. ......................... 47/57.5 |
| 4,110,933 | 9/1978 | Haggblom . |
| 4,164,093 | 8/1979 | Sterrett et al. ...................... 47/57.5 |
| 4,624,070 | 11/1986 | Qluery et al. . |
| 5,046,281 | 9/1991 | Murphy . |

FOREIGN PATENT DOCUMENTS

| | | | |
|---|---|---|---|
| 1089645 | 11/1980 | Canada ............................... | 47/57.5 |
| 0111254 | 6/1984 | European Pat. Off. ............ | 47/57.5 |
| 272644 | 4/1951 | Switzerland ........................ | 47/57.5 |
| 0579971 | 11/1977 | U.S.S.R. ............................. | 47/57.5 |
| 4104 | of 1899 | United Kingdom ................ | 47/57.5 |
| 2231763 | 11/1990 | United Kingdom ................ | 47/57.5 |

Primary Examiner—Carl D. Friedman
Assistant Examiner—Joanne C. Downs
Attorney, Agent, or Firm—Law Offices of John A. Beehner

[57] ABSTRACT

An apparatus and method for injecting liquids directly into the stem or trunk of a plant. The apparatus includes a container for holding liquid, an injection device and a conduit extending between and connected to the container and the injection device. Mounted on the injection device is a tapered, wedged-shaped needle having an outer surface, a liquid-conducting needle conduit and at least one ejector hole extending between the outer surface of the needle and the needle conduit whereby liquid may be transferred from the needle conduit to the outer surface of the needle. Liquid may thus be transferred from the container through the conduit to the injection device, through the needle and out of an ejector hole onto the outer surface of the needle for injection into the stem or trunk of a plant. The method of the present invention includes the steps of providing an apparatus as described above, inserting the needle into the stem or trunk of a plant such that the ejector holes are located interiorly of the outer surface of the stem or trunk, engaging the injection device and injecting the liquid into the stem or trunk of a plant in response to engagement of the injection device. Liquid is thus transferred from the container through the conduit, through the injection device, through the needle conduit and out the ejector hole thereby being deposited in the stem or trunk of the plant. The needle is then removed from the stem or trunk of the plant.

5 Claims, 4 Drawing Sheets

TREE INJECTION SYSTEM

BACKGROUND OF THE INVENTION

1. Technical Field

This invention relates to tree injection systems and, more particularly, to an apparatus for injecting liquids directly into the trunk of a tree, the apparatus having a tapered, wedge-shaped needle having a liquid-conducting conduit in the center of the needle leading to an ejector hole which will conduct liquid to the outer surface of the needle.

2. Description of the Prior Art

Tree injection is the operation of making a cut in a tree and then placing a dose of chemical into the cut. There are several known methods by which this operation may be done. Generally, a cut is made manually by means of an ax or other such hand tool. The cut must be of such a shape and angle as to allow the introduced chemical to remain in the cut while the tree absorbs and transport the chemical throughout the tree. To efficiently accomplish this operation, the cut must be of sufficient size to accommodate the chemical injector. This often results in damage being done to the tree itself, which is acceptable if the goal is to eventually kill the tree, but completely unacceptable if the goal is to improve the health of the tree.

Furthermore, many of the prior art methods of tree injection involve a two-step operation which can be time consuming and involve considerable manual effort. Also, as the operation involves two steps, there is a delay between making the cut into the tree and the introducing of the chemical to the cut, which is critical as trees have the ability to quickly heal up incisions protecting them from entry of bacteria or other such harmful organisms.

An example of the prior art which attempts to address these problems is Murphy, U.S. Pat. No. 5,046,281, which discloses an attachment for a handgun with a moveable piston to which is attached a blade to form a cut in a tree, and a fluid injection means which instantaneously supplies a fluid dosage to the cut. The fuel to operate the handgun, together with the fluid to be applied to the cut, are preferably provided in a backpack. While this invention applies liquid instantaneously when the cut is formed, the problem is that the cut is formed by a blade being thrust into the tree thus opening a large hole and causing damage to the surrounding tree tissue. Furthermore, to operate the apparatus, an operator must carry a backpack which holds the fuel and fluid to be injected. This situation does not present a problem when an operator is injecting one tree a day, but on such places as tree farms, an operator may inject hundreds or thousands of trees in a day, involving considerable walking and bending. Carrying such a backpack can result in various degrees of back and leg strain, due to the additional weight thereof. There is therefore a need for a relatively lightweight tree injection apparatus which can inject trees while causing a minimum of damage to the tree tissue Other examples of the prior art have used other means of injecting plants, such as needles or the like. Examples of such art are found in Mauget, U.S. Pat. No. 3,304,655, and Barber, U.S. Pat. No. 2,116,591, which both disclose injection systems having a needle. However, the problem encountered in utilizing both examples of the prior art is that before the needle may be inserted into a tree, a hole must be formed in the tree, or the needle will be plugged by tree fiber when it is inserted. Generally, at least a ⅛" hole needs to be drilled in the tree to insert the needles of the above inventions, which causes a great deal of damage to a tree, which is not a good way to save a tree. Moreover, both of these examples require a two-step operation to achieve injection of a tree.

Finally, one other example of the prior art which addresses this problem is Tucker, U.S. Pat. No. 3,608,239, which discloses a tree killing poison injector nozzle comprising a tube having a wedge-shaped end portion for entering a cut formed in a tree. The opposing sides of the wedge-shaped end are cut away to define an opening at each of its sides. A poison directing guard, surrounding the tube, forms laterally open channels lying in the plane of the wedge-shaped end. Once again, however, such an injection system is fine for use if the goal is to kill the tree. If the goal is to improve the health of the tree, however, use of the Tucker invention surely will not achieve the desired end. Furthermore, the cut formed by use of the Tucker device is much larger than is desirable to prevent harm to the tree. Finally, fluid is released from nozzles a substantial distance behind the tree cutting edge, thus resulting in a deeper cut having to be made, causing more damage to the tree.

It is therefore an object of the present invention to provide an improved tree injection apparatus.

Another object of the present invention is to provide an improved tree injection method which will cause relatively little damage to a tree.

Yet another object of the present invention is to provide a tree injection apparatus which is relatively light in weight and easily portable.

Still another object of the present invention is to provide a tree injection apparatus which uses a wedge-shaped needle having a fluid outlet hole on the top flat part of the wedge to allow efficient, one-step injection of trees.

Still another object of the present invention is to provide a tree injection apparatus having dosage adjustment means for varying the amount of chemical introduced into a tree.

Finally, an object of the present invention is to provide an apparatus and method for tree injection, the apparatus which is relatively simple to manufacture and safe and efficient in use, and the method which is both time efficient and cost efficient.

SUMMARY OF THE INVENTION

The present invention provides an apparatus for injecting liquids directly into the stem or trunk of a plant and a method utilizing that apparatus for injection.

The apparatus consists of a device for injecting liquid into the stem or trunk of a plant and a source of pressurized liquid. Mounted on the injection device is a needle having a front end, an opposite end adapted for attachment to a source of pressurized liquid and a generally wedge-shaped free end portion having top and bottom surfaces tapering to a thin edge across the free end to facilitate penetration into the cambium of a tree trunk. The needle furthermore has at least one ejector hole through the top surface and adjacent the free end and a liquid conduit through the needle and extending from the opposite end to the ejector hole.

In this manner, upon penetration of the free end portion of the needle into a tree trunk to an extent beyond the ejector hole and upon connection of the opposite end of the needle to the source of pressurized liquid, liquid is injected through the liquid conduit and ejector hole into the tree trunk.

To inject liquids directly into the stem or trunk of a plant, the apparatus as described above is provided. The needle of the apparatus is then inserted into the stem or trunk of a plant such that the ejector holes are located interiorly of the outer surface of the stem or trunk. The injection device is then engaged, which injects liquid into the stem or trunk of the plant. Liquid is transferred from the liquid source through the injection device and through the needle conduit, and is ejected through the ejector hole thus being deposited into the cambium of a tree. The needle is then removed from the tree, and the operation may be repeated on the same plant or another one. As can readily be seen from the above description, this method of tree injection is efficient, simple and quick. The apparatus also described above provides the most effective means for accomplishing the objects of the apparatus and method described previously, and does so in the most efficient way yet achieved.

DESCRIPTION OF THE PREFERRED EMBODIMENT

Figure 1:
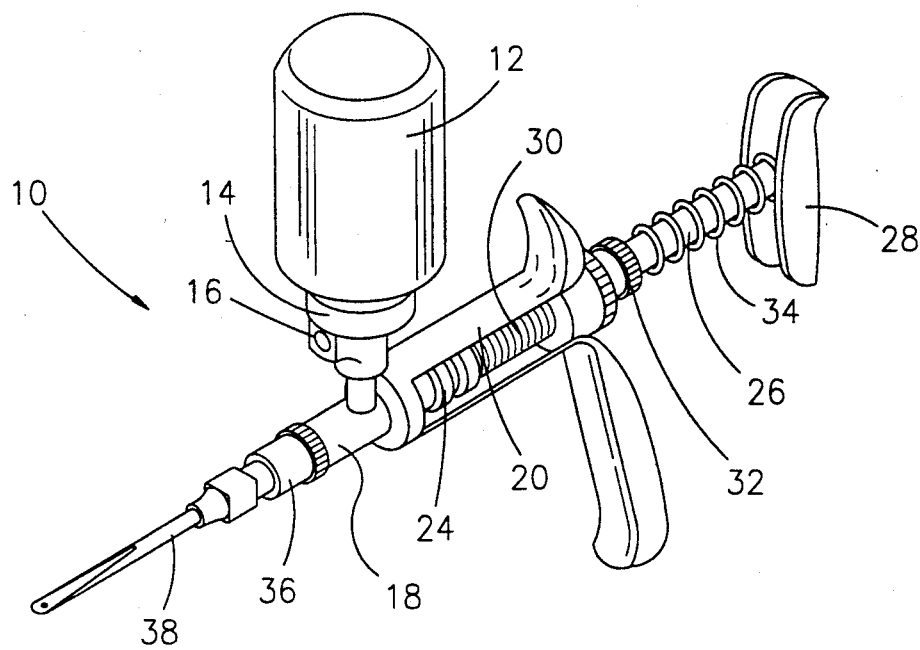
FIG. 1 is a perspective view of the tree injection apparatus of the present invention.
Figure 2:
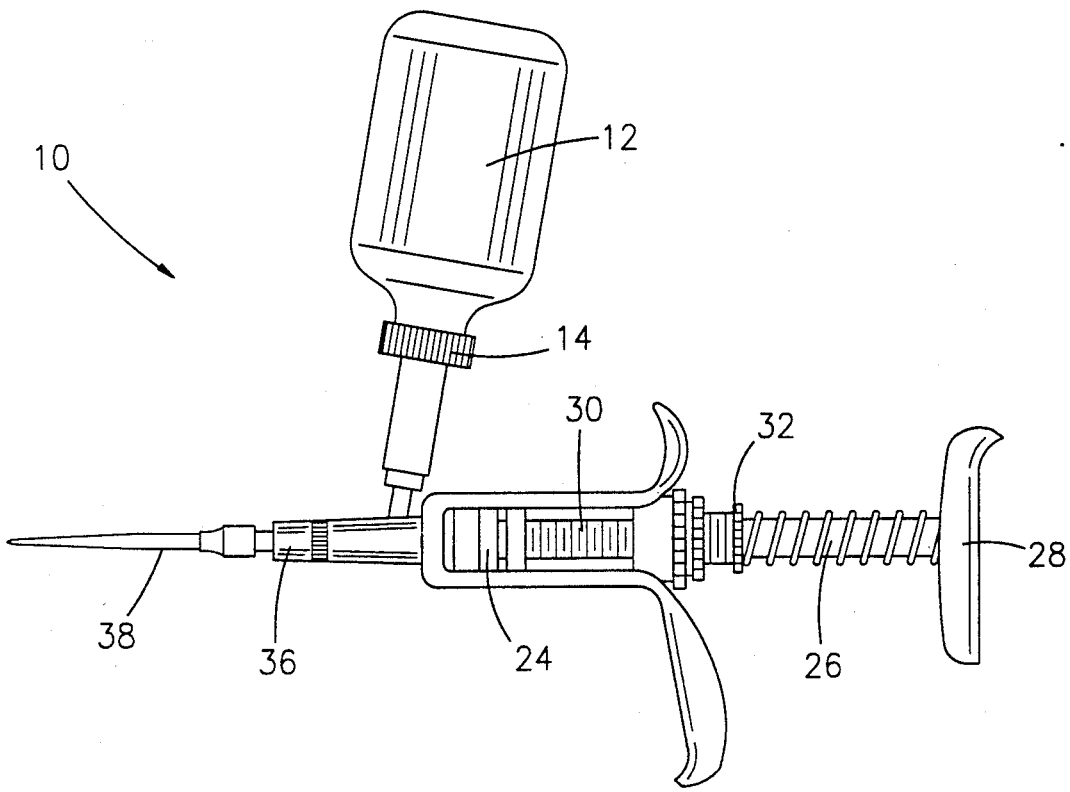
FIG. 2 is a side elevational view of the tree injection apparatus clearly displaying the various elements of the apparatus.

The tree injection apparatus 10 is shown in its preferred embodiment in FIGS. 1 and 2 as including a container 12 which in the preferred embodiment is a serum bottle. The container 12 is designed to hold and dispense liquid such as insecticide, herbicide, plant food or other liquid. The container 12 preferably has an opening having a set of screw threads on the periphery thereof. These are designed to be engaged by a female coupler 14 which may be screwed onto the container 12 thus forming a liquid-tight seal.

Attached to the female coupler is a one-way check valve 16, which allows liquid to flow from the container 12 through the female coupler 14 and through the one-way check valve 16. The one-way check valve 16 is designed to bleed air into the container 12 as liquid is removed therefrom. The container 12 thus retains its shape as there are no unequal pressures, and liquid flow is facilitated. The check valve 16 is connected at the end opposite the female coupler 14 to the frame 20 of the injection apparatus 10. A conduit 22 extends through the frame 20 and into a liquid-holding tube 18, the conduit 22 extending from the one-way check valve 16. Liquid thus may be transported from the container 12 through the female coupler 14 through the one-way check valve 16 into the conduit 22 and then into the liquid-holding injection tube 18. The frame 20 is shown in its preferred embodiment in FIGS. 1 and 2 as including a pair of handles to facilitate use of the apparatus 10.

Movably mounted to the rear end of the liquid-holding injection tube 18 is a plunger 24 which, when moved forward, forces liquid to leave the injection tube 18 from the opposite end of the tube 18 which is positioned adjacent the front end of the frame 20. The amount of liquid in the injection tube 18 is controlled by the plunger member 24 which extends the amount of liquid-holding space in the liquid-holding injection tube 18. The plunger 24 is mounted on a plunger member 26 which extends rearwardly from the plunger 24 through the frame 20. The plunger 24 is preferably a disk of metal or plastic mounted on the plunger member 26 such that the longitudinal axis of the plunger member 26 is collinear with the center axis of the plunger 24. Mounted on the rearward end of the plunger member 26 is a plunger handle 28 which facilitates depressing the plunger member 26.

For adjusting the at-rest position of the plunger 24, a plunger adjustment screw 30 is provided. In a preferred embodiment, the plunger member 26 extends through the plunger adjustment screw 30 where the plunger adjustment screw 30 is shaped as a cylinder, thus the longitudinal axis of the plunger member 26 is coaxial with the longitudinal axis of the plunger adjustment screw 30. The plunger adjustment screw 30 is rotatably supported by the frame 20 such that rotation of the plunger adjustment screw 30 adjusts the at-rest position of the plunger 24. To facilitate rotation of the plunger adjustment screw 30 an adjustment screw knob 32 is mounted on the plunger adjustment screw 30 rearwardly of the frame 20. Also, for returning the plunger 24 to the at-rest position, a spring return 34 is provided in the preferred embodiment consisting of a spring extending along the plunger member 26 between the adjustment screw knob 32 and the plunger handle 28. The spring return 34 provides rearward tension on the plunger handle 28, forcing the plunger handle 28 away from the adjustment screw knob 32 and thus returning the plunger 24 to the at-rest position.

Mounted on the forward end of the frame 20 is a needle mount fitting 36 which is designed to accommodate and secure the needle 38 of the present invention. The needle mount fitting 36 is necessarily shaped as a cylinder to provide a conduit between the liquid-holding injection tube 18 and the needle 38 such that liquid may be transferred from the injection tube 18 into the needle 38. In a preferred embodiment, it is contemplated that the connection means between the needle mount fitting 36 and the needle 38 would be a luer fitting, such as is regularly used in hypodermic injectors.

A preferred embodiment of the present invention would use a hypodermic injector, such as a HENKE-FERRO-MATIC Model No. M86. However, many other similar injectors may be adapted to fulfill the objectives of the present invention.

Figure 3:
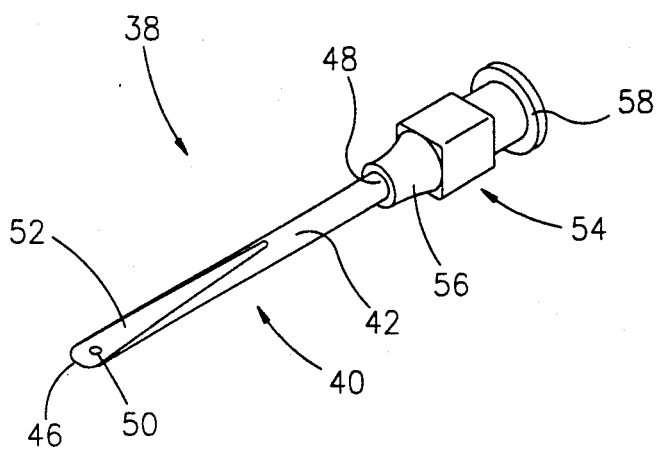
FIG. 3 is a perspective view of the wedge-shaped needle, showing the location of the ejector hole.
Figure 4:
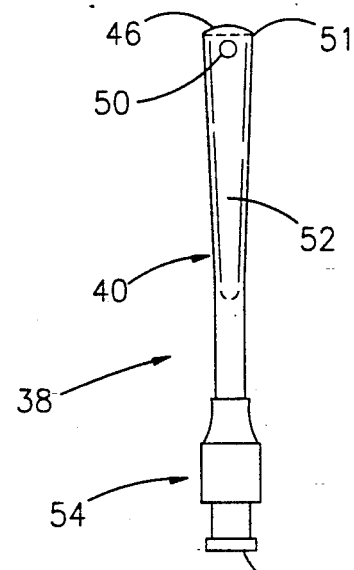
FIG. 4 is a top plan view of the needle, showing the shape of the wedge.
Figure 5:
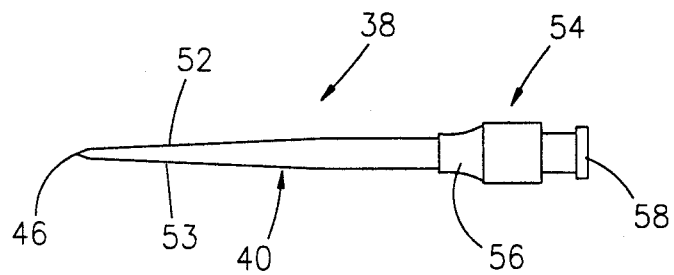
FIG. 5 is a side elevational view of the needle showing the tapering front end of the needle.

The preferred embodiment of the needle 38 is shown in FIGS. 3–5 and as including a tubular conduit 40 having an outer surface 42, an inner conduit 44, a free end 46 and a rear end 48. As seen in FIGS. 4 and 5, the free end 46 of the tubular conduit 40 is flattened and shaped into a wedge having a sharpened edge on the front side. This seals the free end 46 of the tubular conduit 40 such that foreign materials can not enter the inner conduit 44 through the free end 46. This wedge is preferably designed to be sharp enough to penetrate the bark of a tree without inordinate amounts of pressure being exerted by the operator of the tree injection apparatus 10. Extending between the outer surface 42 and the inner conduit 44 of the tubular conduit 40, in a preferred embodiment, is an ejector hole 50 which is formed on the top surface 52 of the wedge shape. The wedge also has bottom surface 52. The hole 50 is preferably formed as close to the cutting edge of the wedge as is practical, allowing an operator of the tree injection apparatus 10 to insert the needle 38 a minimal distance into the tree, thus causing a minimum of damage to the tree. It is preferred that this distance be between 1/16" and ¼" from the free end 46. The ejector hole 50 may be formed in the free end 46 of the tubular conduit 40 by a drill or punch press or other such means.

The needle 38 preferably has the free end 46 formed as a transversely extended, vertically and forwardly tapering wedge shape, as shown in FIGS. 3-5. The exact shape of the free end 46 of the needle 38 is best described by envisioning a transverse line intersecting the free end 46 between the tip of the free end 46 and ejector hole 50, as shown by the dotted line in FIG. 4. The transverse width of the free end 46 as measured along that line 51 is substantially greater than the vertical thickness of the free end 46 when measured at the transverse line 51. In this manner, the wedge shape of the free end 46 may best be explained.

Figure 10:
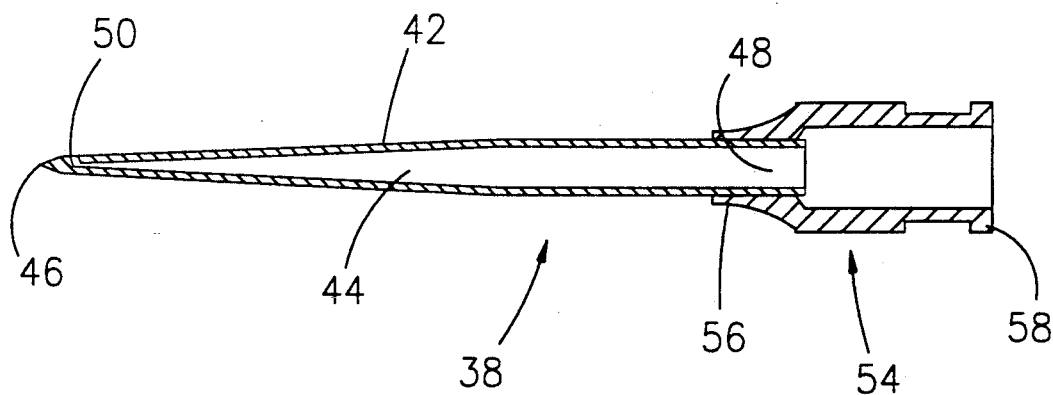
FIG. 10 is a side sectional view of a needle showing the needle conduit and elector hole.

Mounted on the rear end 48 of the tubular conduit 40 is a conduit coupler 54 also called an opposite end. In a preferred embodiment, the connection between the rear end 48 of the tubular conduit 40 and the conduit coupler 54 is a press-fit frictional fit where the rear end 48 of the tubular conduit 40 is slid into the front end 56 of the conduit coupler 54 and is frictionally secured therein. The conduit coupler 54 is preferably generally cylindrical in shape having a narrower front end 56 and wider rear end 58. Centrally located on the conduit coupler 54 is a cubic section 60 which facilitates attachment of the needle 38 to the needle mount fitting 36. As can be seen in FIG. 10, the conduit coupler 54 is tubular, thus providing a conduit for liquid to flow through to the tubular conduit 40.

As was stated above, the preferred connection between the needle 38 and the needle mount fitting 36 is a luer fitting. The rear end 58 of the conduit coupler 54 is thus shaped to conform to the male end of a luer fitting, while the needle mount fitting 36 is shaped as the female section of a luer fitting. The needle 38, needle mount fitting 36 and liquid-holding injection tube 18 thus form a continuous conduit for liquid to be ejected from the tree injection apparatus 10 through the ejector hole 50.

Figure 9:
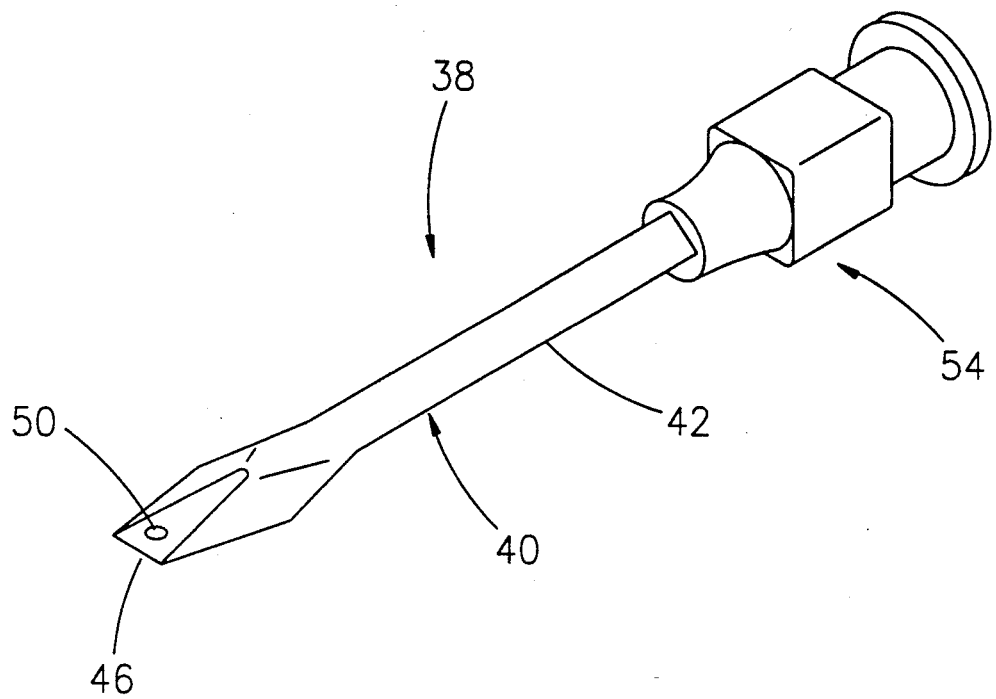
FIG. 9 is a perspective view of an alternative embodiment of the needle having a tip shaped like a flat-head screw driver.

An alternative embodiment of the front end 46 of the tubular conduit 40 is shown in FIG. 9 Where the wedge shape of the free end 46 has been adjusted to resemble the end of a flat-head screw driver. For some applications of the tree injection apparatus 10 such a shape as shown in FIG. 9 may achieve better results.

Figure 6:
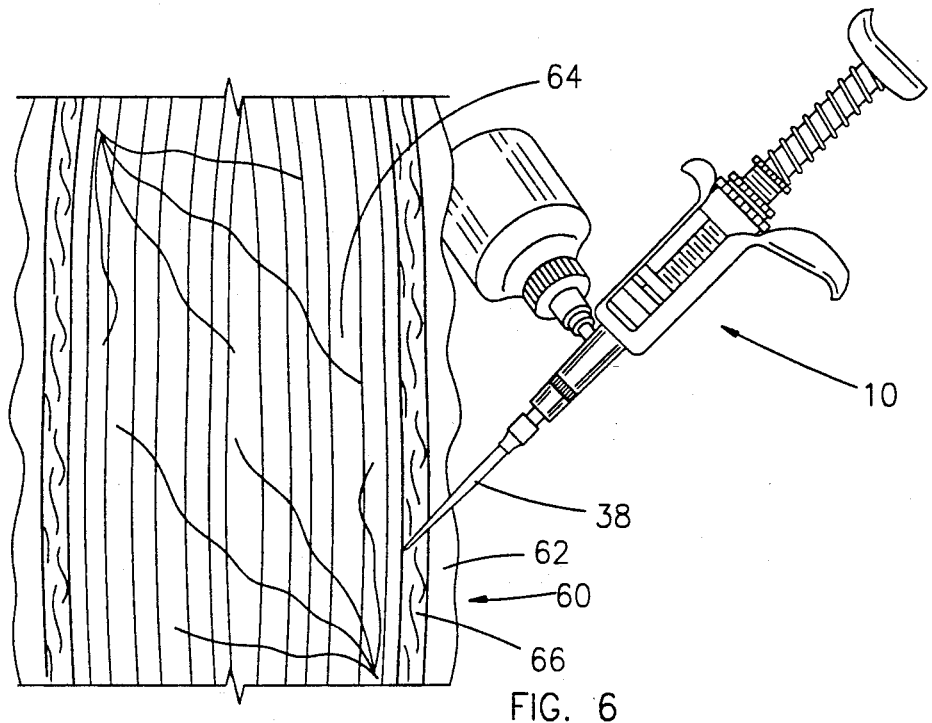
FIG. 6 is a perspective view of the tree injection apparatus inserted into a tree.
Figure 7:
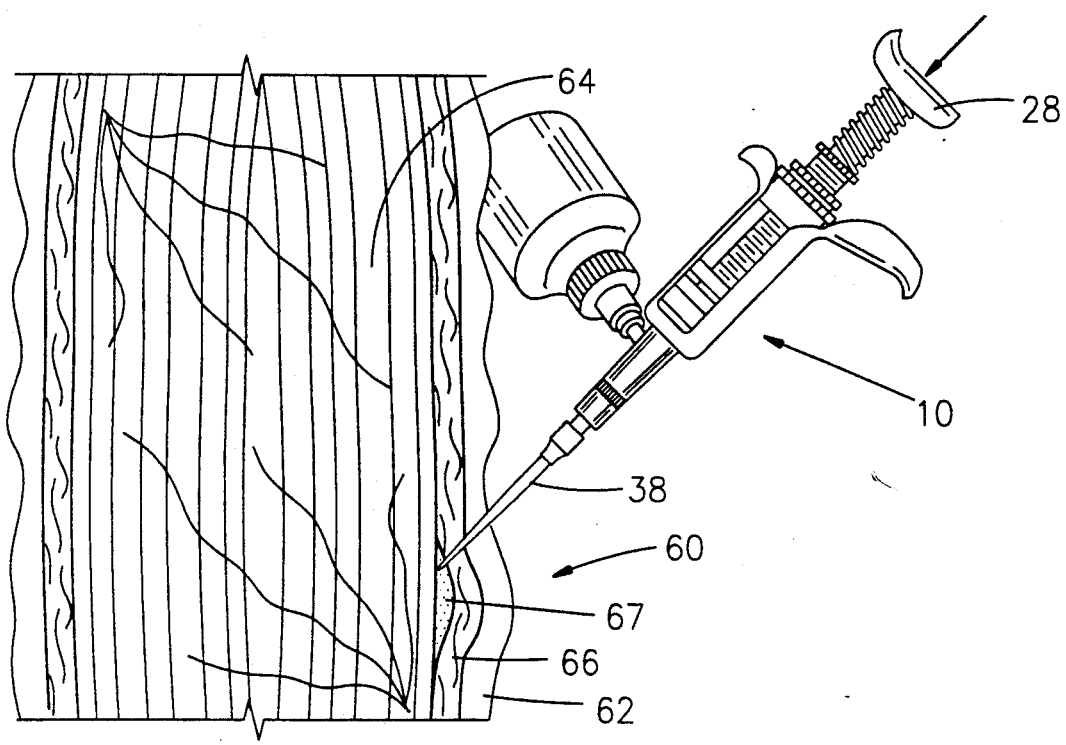
FIG. 7 is a perspective view of the apparatus as in FIG. 6 with the plunger depressed injecting liquid into a tree.

The method of injecting liquids into the stem or trunk of a plant contemplated in the present invention is as follows. First, the apparatus as described above is provided, the container 12 holding some form of insecticide, plant food, herbicide, fungicide or other treatment in liquid form. The needle 38 is then inserted into a tree 60, as shown in FIG. 6, until the ejector hole 50 is inside of the exterior surface of the tree 60. It is preferable that the needle 38 be inserted with the ejector hole 50 facing upwards, and therefor the wedge shape of the front end 46 of the tubular conduit 40 would be substantially horizontal. Moreover, the needle 38 is preferably inserted at an angle of greater than 45° above horizontal to most efficiently apply chemicals, otherwise some chemical may leak out. The plunger handle 28 is then depressed depressing the plunger 24 and injecting liquid 67 into the tree 60 through the ejector hole 50, as shown in FIG. 7. The amount of liquid 67 injected into the tree 60 may be adjusted by turning the adjustment screw knob 32 on the tree injection apparatus 10, which adjusts the plunger adjustment screw 30. It is preferred that the injection of liquid 67 take place between the outer bark 62 of a tree 60 and the inner wood 64 of the tree 60, the liquid 67 thus being injected into the cambium 66. In this way, the liquid 67 is most quickly transported to various parts of the tree 60. When the needle 38 is removed from the tree 60, the bark 64 and cambium 66 of the tree 60, due to their resiliency, close the needle hole as the needle 38 is removed, thus keeping the liquid 67 deposited in the hole in place.

Figure 8:
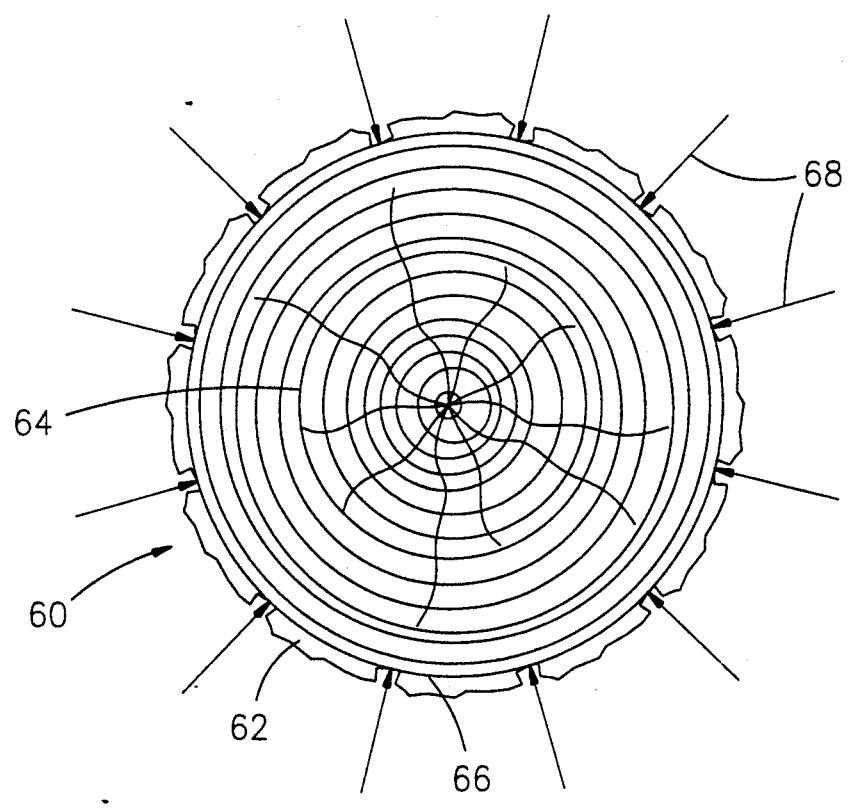
FIG. 8 is a sectional view of a tree showing desirable injection points around the circumference of the tree.

As shown in FIG. 8, a plurality of injection points 68 (indicated by the arrows 68 on the figure) are required to properly administer chemicals to a large tree. The cross-section shown in FIG. 8 is of a tree having a circumference of approximately sixty inches, and it is contemplated that injections approximately six inches apart around the circumference of a tree 60 will produce the most benefit for the tree 60. It is preferable that the injections be done in the flare of a tree, but may be done in the trunk if more convenient.

As can be seen from the above description, the method of injecting trees disclosed by the present invention is far superior to any indicated in the prior art. The simplicity and rapidity with which this operation can be performed combined with the minimal amount of damage caused to the tree by the method indicate that the present invention will provide a substantial improvement over methods and apparati of the prior art.

Furthermore, it is to be understood that numerous modifications and adjustments to both the apparatus and method of the present invention may be performed. For example, a completely different injection device than the one described above may be used in conjunction with the needle of the present invention. Alternatively, the needle itself may include a plurality of ejector holes for injecting liquid into larger diameter trees at various depths in the tree. Therefore, the above description is not intended in any way to limit the scope of the present invention, the scope of which shall follow in the claims set forth below.

There has thus been set forth and described an invention which accomplishes all of the stated objectives.

I claim:

1. An apparatus for injecting liquids directly into the cambium layers of a tree trunk, comprising; a liquid injection means;

a longitudinally extended needle for injecting liquid into the cambium layers of a tree trunk, said needle comprising;

a tubular conduit having an outer surface, inner conduit and front and rear end portions, said front end portion formed into a wedge having tapered top and bottom sloping surfaces and having a transversely extended tip, said front end portion of said tubular conduit further comprising a flat-head screwdriver shape wedge having top and bottom sloping surfaces and sideways protruding flanges;

a conduit coupler attached to said rear end portion of said tubular conduit such that liquid may flow through said conduit coupler into said tubular conduit;

an ejector hole formed on one of said top or bottom sloping surfaces of said needle, said ejector hole spaced from said tip of said needle and extending between said outer surface and said inner conduit of said tubular conduit such that liquid transported within said inner conduit may flow through said ejector hole and be deposited outside of said tubular conduit; and said front end portion having a transversely extended, vertically and forwardly tapering wedge shape such that on any transverse line intersecting said front end portion at a position between said tip and said ejector hole, the transverse width of said front end portion as measured along said line is substantially greater than the vertical thickness of said front end portion measured at said line.

2. A method for injecting liquids directly into the cambium layers of a tree trunk, said tree trunk having an outer surface and an inner wood layer, said cambium layers being located between said outer surface and said inner wood layer, said method comprising:

providing a container for holding liquid, injection means connected to said container, a tapered, longitudinally extended needle having a front end portion having a transversely extended, vertically and forwardly tapering wedge shape, said front end portion tapering to a transversely extended tip, said needle further having an outer surface, a liquid-conducting needle conduit and at least one ejector hole extending between said outer surface of said needle and said needle conduit, said ejector hole being spaced from said tip of said needle, and said needle mounted on said injection means such that said liquid may be transferred from said container to said injection means and through said needle conduit to said outer surface of said needle;

inserting said needle into the trunk of a plant such that said ejector hole is located interiorly of the outer surface of the trunk and exteriorly of the inner wood layer of the tree trunk by said spacing of said ejector hole from said;

engaging said injection means;

injecting said liquid into the cambium layers of a tree trunk in response to engagement of said injection means such that liquid is transferred from said container through said injection means through said needle conduit and out said ejector hole thereby being deposited in the cambium layers of a tree trunk; and removing said needle from the cambium layers of a tree trunk.

3. A method for injecting liquids directly into the cambium layers of a tree trunk, said tree trunk having an outer surface and an inner wood layer, said cambium layers having located between said outer surface and said inner wood layer, said method comprising:

providing a liquid injection means having a container for multiple injections of liquid, said liquid injection means having a needle having a front end portion having a transversely extended, vertically and forwardly tapering wedge shape, said front end portion tapering to a transversely extended tip, said needle further having at least one ejector hole formed in said needle, said ejector hole being spaced from said front end portion of said needle, said needle mounted thereon such that liquid may be transferred from said container through said needle and out of said ejector hole;

at least partially filling said container with a multiple-injection supply of liquid, inserting said needle through a previously unpierced section of bark and into the cambium layer of a tree trunk such that said transversely extended tip of said needle contacts the inner wood layer of a tree trunk without substantially penetrating said inner wood layer whereby said ejector hole is positioned in said cambium layer by said spacing of said ejector hole from said tip;

engaging said injection means;

injecting liquid into the cambium layer of a tree trunk in response to engagement of said injection means such that liquid is transferred from said liquid injection means through said needle and out said ejector hole thereby being deposited in the cambium layer of a tree trunk;

removing said needle from the tree trunk; and repeating said inserting, engaging, injecting and removing steps in a different location on a tree to further inject liquid from said supply prior to refilling said container.

4. The method of claim 3 wherein said liquid to be injected is a beneficial liquid selected from the group consisting of insecticides, herbicides, fungicides and fertilizers.

5. The method of claim 3 wherein said repeating step further comprises inserting, engaging, injecting and removing said needle in a plurality of points about a circumference of a tree such that said tree may be injected with fluid at a plurality of spaced points to provide maximum benefit for the tree being treated.

* * * * *